United States Patent
Wischinski

(10) Patent No.: US 7,130,701 B1
(45) Date of Patent: Oct. 31, 2006

(54) SYSTEM FOR REMOTE CONFIGURATION MONITORING OF AN INDUSTRIAL CONTROL SYSTEM

(75) Inventor: Rainer H. Wischinski, Sandown, NH (US)

(73) Assignee: Schneider Automation Inc., North Andover, MA (US)

( * ) Notice: Subject to any disclaimer, the term of this patent is extended or adjusted under 35 U.S.C. 154(b) by 0 days.

(21) Appl. No.: 09/578,132

(22) Filed: May 24, 2000

(51) Int. Cl.
 *G05B 19/18* (2006.01)
 *G06F 9/44* (2006.01)

(52) U.S. Cl. .................... 700/65; 700/108; 700/66; 700/96; 717/168

(58) Field of Classification Search ............... 700/65, 700/108, 66, 96; 707/10; 705/28, 8; 717/173, 717/172, 168; 709/223, 229, 203
See application file for complete search history.

(56) References Cited

U.S. PATENT DOCUMENTS

| | | | | |
|---|---|---|---|---|
| 5,434,775 A * | 7/1995 | Sims et al. | ............ | 705/28 |
| 5,579,511 A | 11/1996 | Cavasa et al. | | |
| 5,786,998 A * | 7/1998 | Neeson et al. | ............ | 701/35 |
| 5,800,473 A | 9/1998 | Faisandier | | |
| 5,903,455 A | 5/1999 | Sharpe Jr., et al. | | |
| 6,041,183 A * | 3/2000 | Hayafune et al. | ........... | 717/173 |
| 6,122,639 A * | 9/2000 | Babu et al. | ............ | 707/103 R |
| 6,151,643 A * | 11/2000 | Cheng et al. | ............ | 710/36 |
| 6,230,199 B1* | 5/2001 | Revashetti et al. | ......... | 709/224 |
| 6,363,359 B1* | 3/2002 | Gronemeyer et al. | ......... | 705/28 |
| 6,385,497 B1 | 5/2002 | Ogushi et al. | | |
| 6,438,444 B1 | 8/2002 | Mizuno et al. | | |
| 6,658,251 B1 | 12/2003 | Lee et al. | | |
| 2001/0047213 A1* | 11/2001 | Sepe | ........................ | 700/65 |
| 2002/0029086 A1* | 3/2002 | Ogushi | ..................... | 700/65 |

FOREIGN PATENT DOCUMENTS

| | | |
|---|---|---|
| EP | 0 811 942 A2 | 12/1997 |
| EP | 0 822 473 A2 | 2/1998 |
| EP | 0 838 742 | 4/1998 |
| FR | 2 692 701 | 12/1993 |
| JP | 2000138706 A | 5/2000 |

* cited by examiner

*Primary Examiner*—Thomas Pham

(57) ABSTRACT

A system for providing technical support for remote automation or remote control devices, the system including: a device identifier (35), for determining components of predetermined automation or control devices, such as for example programmable logic controllers, indicated in a device database (33), by periodically querying the devices for component hardware, software, and firmware, and for providing thereby the device database (33) with component identifications for the predetermined devices; and a device configuration manager (36), responsive to the component identifications and further responsive to available device components in a database (34) of available device components, for comparing the installed and available device components and for providing an offer to upgrade installed device components; and also typically including a system diagnostics manager (32), responsive to the component identifications, and further responsive to diagnostics information in a diagnostics database (31), for providing device status queries, and for updating the diagnostics database (31).

14 Claims, 2 Drawing Sheets

SYSTEM FOR REMOTE CONFIGURATION MONITORING OF AN INDUSTRIAL CONTROL SYSTEM

BACKGROUND OF THE INVENTION

1. Technical Field

The present invention pertains to the field of industrial control automation. More particularly, the present invention pertains to providing technical support over a network for an industrial control system.

2. Description of Related Art

Industrial control systems (ICSs) are often provided technical support by vendors of equipment used in the control systems. As new equipment becomes available, including hardware, software or firmware, it would be useful for both the control system user/owner and the vendor if the vendor were able to automatically suggest to an end user, from a remote location (the vendor's facility), specific upgrades to the existing equipment, as opposed to for example, simply providing periodically end users with a catalog of the latest available equipment. To do this for only the equipment that the vendor originally provided would require only that the vendor keep track of the latest equipment the vendor provided to the end user. But it is also desirable for a vendor to be able to suggest to an end user that equipment provided by some other vendor be replaced by the vendor's new equipment.

Today, industrial control systems can often be interrogated to determine what equipment is being used. Thus, a vendor can learn what equipment is being used in an ICS even when the equipment was provided by another vendor.

What is needed is a system for interrogating an ICS from a remote location to learn what equipment is being used, and in case of an alternative to a piece equipment being available, to suggest to the owner/operator of the ICS that the piece of equipment be replaced.

SUMMARY OF THE INVENTION

Accordingly, the present invention provides a system for providing technical support for remote automation or control devices, including: a device identifier, for determining components of pre-determined automation or control devices indicated in a device database by periodically querying the devices to have each device indicate its component hardware, software, and firmware, the device identifier for providing the device database with component identifications for the predetermined devices; and a device configuration manager, responsive to the component identifications in the device database, and further responsive to available device components in a database of available device components, for comparing the installed device components with the available device components and for providing an offer to upgrade installed device components.

In a further aspect of the invention, the system also includes: a system diagnostics manager, responsive to the component identifications in the device database, and further responsive to diagnostics information in a database of end user system diagnostics, for providing device status queries, and for updating the database of end user system diagnostics based on responses to the device status queries.

In another, further aspect of the invention, the components of pre-determined automation or control devices are programmable logic controllers.

In yet another, further aspect of the invention, the device identifier communicates with the components of pre-determined automation or control devices via a wireless access protocol.

In still another, further aspect of the invention, the system also includes a general technical information database, for providing general technical information about products organized by topic, and further wherein the general technical information database maintains a record of requests for information made about a topic, thereby providing feedback on the useability of products.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
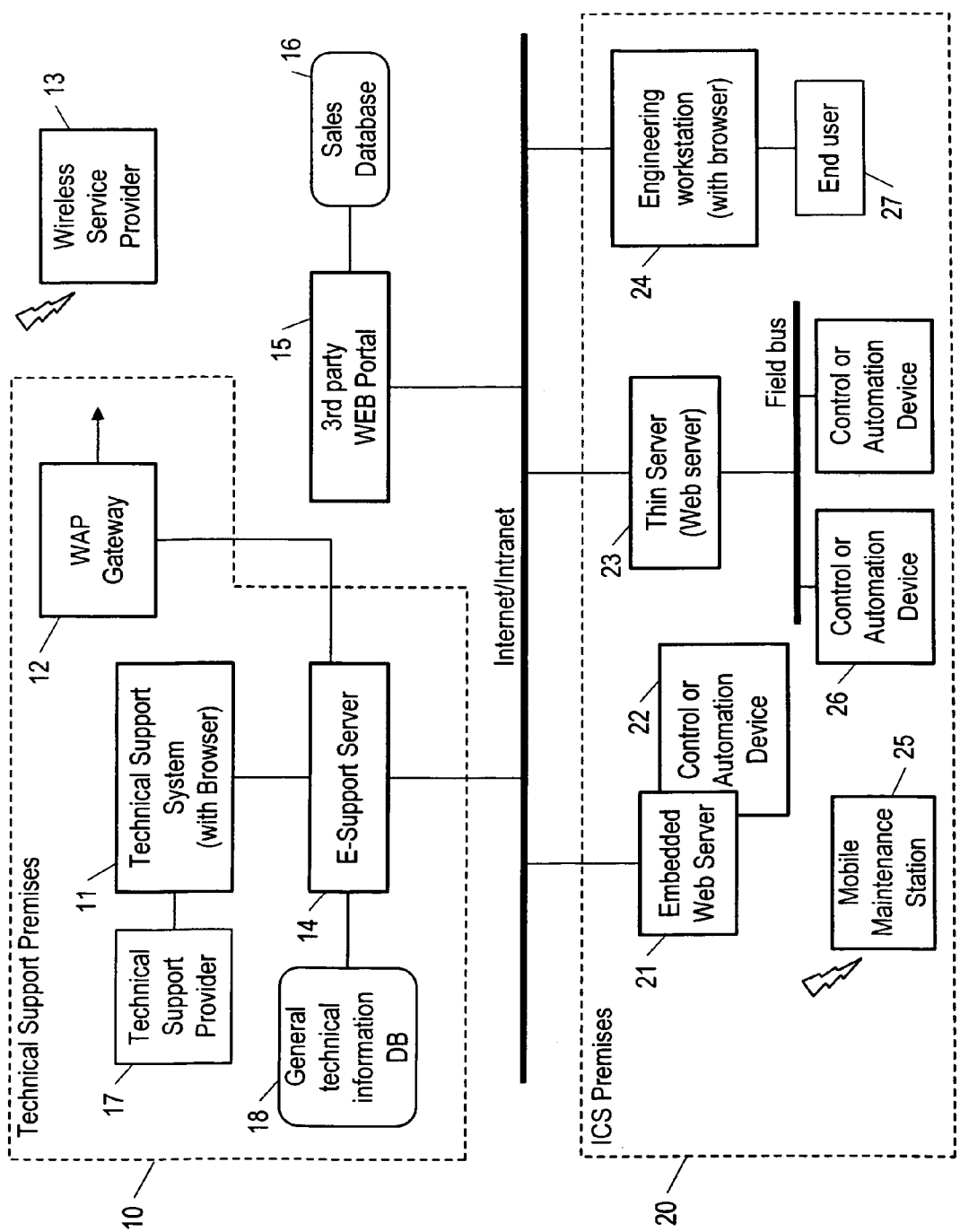
FIG. 1 is a context block diagram showing a technical support system for interrogating an ICS and for providing suggestions for upgrading components (pieces of equipment) used by the ICS.

Referring now to FIG. 1, to interrogate an industrial control system (ICS) and provide suggestions for upgrading components (pieces of equipment) used by the ICS, a technical support system (TSS) 11 includes a browser for communicating over the Internet via an E-support (indicating support over the Internet) server 14. Either autonomously or at the direction of a technical support provider 17, the TSS 11 at the technical support premises 10 interrogates control or automation devices 22 and 26 of an ICS at ICS premises 20. The control or automation devices 22 and 26 can be connected to the Internet either via a separate server, such as a thin server 23 (any industrialized dedicated support and diagnostic server used to web-enable low-end or legacy devices), or via an embedded web server 21. Communication over the Internet is also shown occurring through a wireless access protocol (WAP) gateway 12 to a wireless (Internet) service provider 13. Correspondingly, at the ICS premises, Internet communications are received via a mobile maintenance station 25, such as a cell phone with an interface to a browser. Having the WAP gateway and the mobile maintenance station 25 allows a service provider on a call to a customer to use a cell phone to call the E-support server 14 through the WAP gateway and obtain information about the customer's system configuration and so to determine what equipment to bring on the call.

FIG. 1 also shows a 3rd party WEB portal 15 having access to a sales database 16. The 3rd party WEB portal is a separate E-server, remote from the technical support premises and connected via the Internet to the E-support server 14 at the technical support premises. The sales database 16 stores sales information from which information about the configuration of an ICS can be determined.

If the TSS 11 detects equipment being used by the ICS, equipment that the owner/operator might wish to replace with alternative equipment, the TSS (again either autonomously or under the direction of a technical support provider 17) sends a message to an end user 27 of the ICS indicating that new equipment is available and asking whether the end user would like to replace or upgrade the equipment currently in use.

Figure 2:
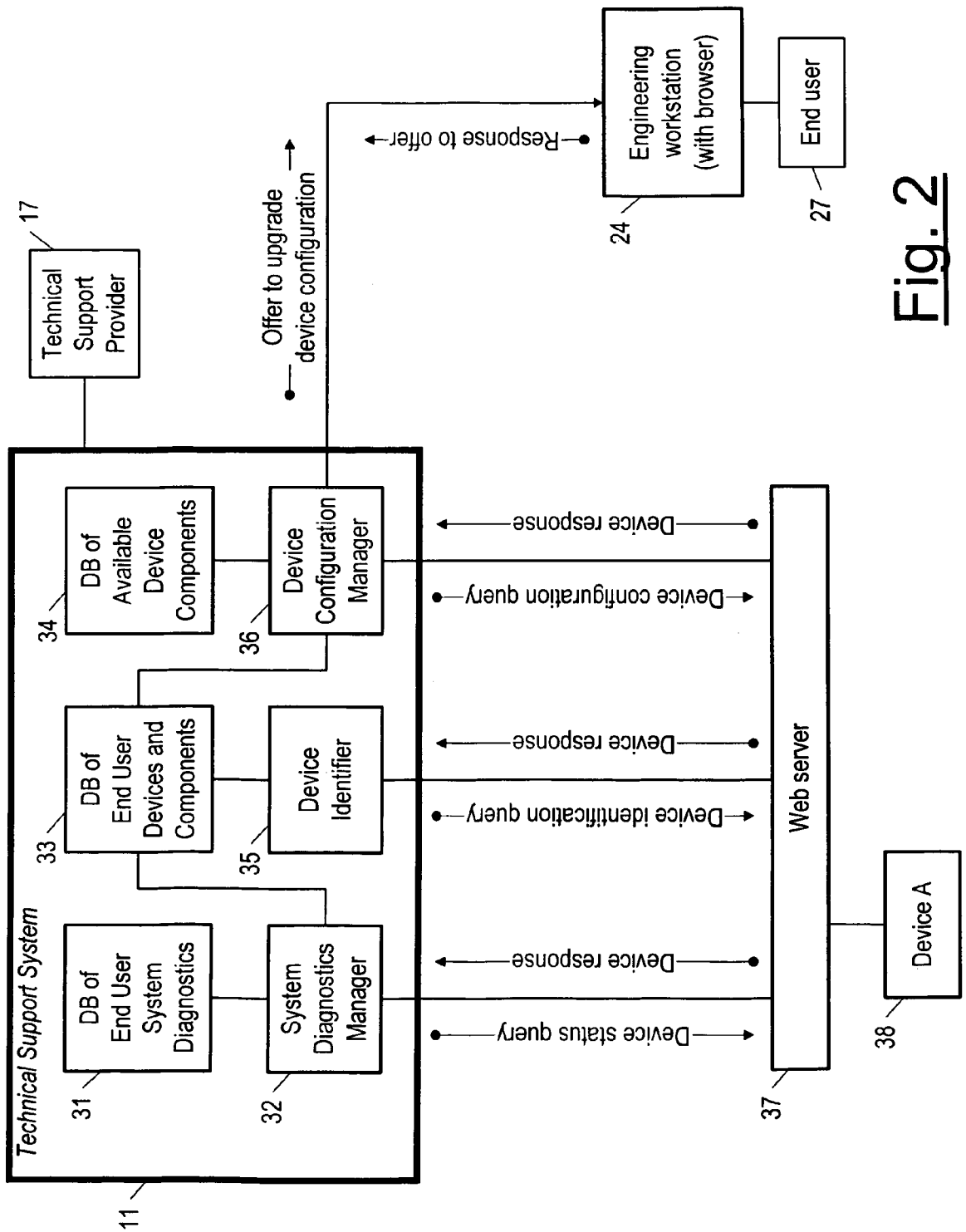
FIG. 2 is a more detailed block diagram of the technical support system module showing its interaction with equipment of the ICS and with the owner/operator of the ICS (end user).

Referring now to FIG. 2, the TSS 11 is shown in more detail as including a device identifier 35 that interrogates, over the Internet, ICS device 38 attached to the Internet via a web server 37, which may be an embedded server or a standalone server. Based on the information provided in the responses, the device identifier 35 updates a database (DB) 33 of end user devices and components of devices. In turn, a device configuration manager 36 examines the DB 33 of end use devices and components, comparing them with available equipment stored in a DB 34 of available device components. If the device configuration manager 36 detects that the owner/operator might wish to replace or upgrade some equipment, the device configuration manager 36 (either autonomously or under the direction of a technical support provider 17) sends a message to an end user 27 of the ICS via an engineering workstation 24 indicating that new equipment is available and offering to replace the equipment currently in use. If the response by the end user 27 is to accept the offer to upgrade and the equipment to be upgraded is software or programmable firmware, the technical support provider 17 will work with the end user 27 to put the ICS in a state to accept the upgrade. Usually, for example, the device with the equipment to be upgraded will have to be put in a safe state before the upgrade is made. The upgrade can then be performed over the Internet, and the device returned to a state of control or automation after the upgrade is completed. In case of upgrading hardware, however, the equipment must first be shipped to the ICS facility. After it arrives, the technical support provider 17 works with the end user 27 to put the ICS in a state to accept the upgrade, and directs the end user in swapping out the equipment.

Besides providing updates or alternatives to ICS equipment in the sense of control or automation devices, the device identifier 35 can also identify (software) tools being used by the ICS to monitor and predict performance of the ICS network, usually a proprietary network, to perform process optimization (for example, to tune the network or to tune an application), to do configuration management (keeping track of changes to the ICS configuration, including changes made to application software), to perform quotations for system upgrades, to perform troubleshooting in case of a malfunction by the ICS, and tools to enable programming for elements of the ICS including either devices or the ICS network.

The remote interrogation capability of the present invention is also useful in performing system diagnostics from the technical support premises, i.e. remotely. System diagnostics includes diagnostics directed to preventive maintenance, machine utilization, machine troubleshooting and other machine diagnostics, process diagnostics, and overall system diagnostics. Thus, system diagnostics are needed for example in troubleshooting, i.e. in case of having to identify an error condition in the ICS, or in detecting when preventive maintenance is needed, including possibly replacing equipment, or in performing process control decisions for the ICS. Still referring to FIG. 2, the TSS 11 is shown as also including a system diagnostics manager 32 that interrogates the device 38 of the ICS to obtain status information from the device, the information then being used by the system diagnostics manager 32 at the technical support premises, possibly with intervention by the technical support provider 17, in performing system diagnostics for the ICS.

Referring again to FIG. 1, the present invention also provides a general technical information DB 18, hosted by the E-support server 14, accessible to the end user 27, but kept secure against unauthorized attempts at changes to its data. It includes documents providing technical information about products produced by a manufacturer, i.e. brochures, manuals, help, frequently asked questions, problem resolution procedures, technical images (such as photographs and drawings), and associated maintenance documentation, as well as other general technical information. The general technical information database 18 is structured by topic, regularly updated, and allows hyperlinking from web-connected tools, i.e. tools such as a browser. In addition, the general technical information database 18 includes structured interactive training modules to familiarize users with new technology.

The database 18 of general technical information tracks the number of hits for each topic stored in the database, i.e. it tracks the number of customer requests to view each topic. In addition, it tracks which customer makes each request. Such tracking information is used to determine which products are difficult for a customer to use, and which customers in particular are experiencing difficulty using a particular product. Thus, the database 18 of general technical information provides feedback information on the useability of products, feedback that can be used to improve the products.

Through remote interrogation of ICS devices, the present invention thus provides an approach to meeting customer needs that is individualized to the customer, context-driven and needs specific.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:
1. A system for remote configuration monitoring of an industrial control system (2), the system comprising:
   a) a device identifier (35), for determining components of an automation or control device (26) included in the industrial control system (20) by periodically querying the device (26) to obtain from the device (26) information identifying at least some of its component hardware, software and firmware, the device identifier (35) for providing a device database (33) with component identifications for the device (26); and
   b) a device configuration manager (36), responsive to the component identifications in the device database (33), and further responsive to available device components in a database (34) of available device components, for comparing the installed device components with the available device components and for providing an offer to upgrade installed device components, wherein the database stores data relating to requests for information regarding the device components.
2. The system of claim 1, further comprising:
   c) a system diagnostics manager (32), responsive to the component identifications in the device database (33), and further responsive to diagnostics information in a database (31) of end user system diagnostics, for providing device status queries, and for updating the database (31) of end user system diagnostics based on responses to the device status queries.

3. A system as in claim 1, wherein the device components of the automation or control devices are programmable logic controllers.

4. A system as in claim 1, wherein the device identifier communicates with the components of the automation or control devices via a wireless access protocol.

5. A system as in claim 1, further comprising a general technical information database (18), for providing general technical information about products organized by topic, and further wherein the general technical information database (18) maintains a record of requests for information made about a topic, thereby providing feedback on the useability of products.

6. A system as in claim 5, further wherein the record of requests for information made about a topic includes an identification of the requester.

7. A system as in claim 1, wherein the device identifier (35) queries the devices via the Internet.

8. A system for remote configuration monitoring of an industrial control system (2), the system comprising:
   a) a device identifier (35), for determining components of a plurality of automation or control devices (22 or 26) included in the industrial control system (2) by periodically querying the devices (22 or 26) to obtain from each device (26) information identifying at least some of its component hardware, software and firmware, the device identifier (35) for providing a device database (33) with component identifications for the devices (22 or 26); and
   b) a device configuration manager (36), responsive to the component identifications in the device database (33), and further responsive to available device components in a database (34) of available device components, for comparing the installed device components with the available device components and for providing an offer to upgrade installed device components, wherein the database stores data relating to requests for information regarding the device components.

9. The system of claim 8, further comprising:
   c) a system diagnostics manager (32), responsive to the component identifications in the device database (33), and further responsive to diagnostics information in a database (31) of end user system diagnostics, for providing device status queries, and for updating the database (31) of end user system diagnostics based on responses to the device status queries.

10. A system as in claim 8, wherein the device components of at least one of the plurality of automation or control devices are programmable logic controllers.

11. A system as in claim 8, wherein the device identifier communicates with the components of the automation or control devices via a wireless access protocol.

12. A system as in claim 8, further comprising a general technical information database (18), for providing general technical information about products organized by topic, and further wherein the general technical information database (18) maintains a record of requests for information made about a topic, thereby providing feedback on the useability of products.

13. A system as in claim 12, further wherein the record of requests for information made about a topic includes an identification of the requester.

14. A system as in claim 8, wherein the device identifier (35) queries the devices via the Internet.

* * * * *